US012510699B2

(12) United States Patent
Attard et al.

(10) Patent No.: US 12,510,699 B2
(45) Date of Patent: Dec. 30, 2025

(54) OPTICAL CONSTRUCTION

(71) Applicant: 3M INNOVATIVE PROPERTIES COMPANY, St. Paul, MN (US)

(72) Inventors: Joseph P. Attard, Woodbury, MN (US); Kristy A. Gillette, Spring Valley, WI (US); Tri D. Pham, Woodbury, MN (US); Zhaohui Yang, North Oaks, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 506 days.

(21) Appl. No.: 18/171,748

(22) Filed: Feb. 21, 2023

(65) Prior Publication Data

US 2023/0280512 A1    Sep. 7, 2023

Related U.S. Application Data

(60) Provisional application No. 63/316,000, filed on Mar. 3, 2022.

(51) Int. Cl.
*G02B 5/20* (2006.01)
*G02B 3/00* (2006.01)

(52) U.S. Cl.
CPC ........... *G02B 5/201* (2013.01); *G02B 3/0075* (2013.01)

(58) Field of Classification Search
CPC ....... G02B 5/201; G02B 3/0075; G02B 5/208
USPC .............................................................. 430/7
See application file for complete search history.

(56) References Cited

U.S. PATENT DOCUMENTS

| | | |
|---|---|---|
| 5,175,030 A | 12/1992 | Lu et al. |
| 5,183,597 A | 2/1993 | Lu |
| 5,882,774 A | 3/1999 | Jonza et al. |
| 6,783,349 B2 | 8/2004 | Neavin et al. |
| 6,949,212 B2 | 9/2005 | Merrill et al. |
| 6,967,778 B1 | 11/2005 | Wheatley et al. |
| 7,864,450 B2 | 1/2011 | Segawa et al. |
| 8,213,082 B2 | 7/2012 | Gaides et al. |
| 8,503,122 B2 | 8/2013 | Liu et al. |
| 9,162,406 B2 | 10/2015 | Neavin et al. |
| 9,335,449 B2 | 5/2016 | Gaides et al. |
| 9,464,179 B2 | 10/2016 | Kolb et al. |
| 9,568,653 B2 | 2/2017 | O'Neill et al. |
| 10,293,370 B2 | 5/2019 | Haag et al. |

(Continued)

FOREIGN PATENT DOCUMENTS

WO    2021255596 A1    12/2021

*Primary Examiner* — Caleen O Sullivan
(74) *Attorney, Agent, or Firm* — Clifton F. Richardson

(57) ABSTRACT

An optical construction includes a lens layer having a structured first major surface including a plurality of microlenses; an optical filter disposed on the lens layer; an optically opaque mask layer disposed between the lens layer and the optical filter and defining a plurality of openings therein; and a low index layer disposed on the optical filter. For a first wavelength in a visible wavelength range, a second wavelength that can be in an infrared wavelength range, the optical filter has: an optical transmission of greater than about 50% for the first wavelength for each of a first incident angle of less than about 10 degrees and a second incident angle of greater than about 30 degrees, and for the second wavelength, an optical transmission of less than about 15% for the first incident angle and of greater than about 30% for the second incident angle.

12 Claims, 9 Drawing Sheets

(56) References Cited

U.S. PATENT DOCUMENTS

| | | |
|---|---|---|
| 10,745,541 B2 | 8/2020 | Kubo et al. |
| 10,761,320 B2 | 9/2020 | Sitter et al. |
| 10,809,445 B2 | 10/2020 | Johnson et al. |
| 2006/0169878 A1* | 8/2006 | Kasano ................. H10F 39/024 |
| | | 250/226 |
| 2007/0109438 A1 | 5/2007 | Duparre et al. |
| 2008/0005005 A1 | 1/2008 | Billieux |
| 2009/0159195 A1* | 6/2009 | Segawa ................. G02B 3/0056 |
| | | 156/272.8 |
| 2012/0064296 A1 | 3/2012 | Walker, Jr. et al. |
| 2017/0368569 A9 | 12/2017 | Wolk et al. |
| 2018/0012069 A1 | 1/2018 | Chung et al. |
| 2021/0019017 A1 | 1/2021 | Yeke et al. |
| 2021/0271003 A1 | 9/2021 | Yang et al. |
| 2023/0333289 A1* | 10/2023 | Maki ..................... G02B 5/005 |
| 2023/0400606 A1* | 12/2023 | Ringberg ............... G02B 5/005 |
| 2024/0027262 A1* | 1/2024 | Sharma ................. G02B 5/005 |
| 2024/0094444 A1* | 3/2024 | Sharma ............. G02B 13/0085 |
| 2024/0096127 A1* | 3/2024 | Sharma ................. G02B 5/003 |
| 2025/0035823 A1* | 1/2025 | Shenoy ............. B29D 11/00788 |

\* cited by examiner

OPTICAL CONSTRUCTION

SUMMARY

In some aspects of the present description, an integral optical construction is provided. The integral optical construction includes a lens layer having a structured first major surface including a plurality of microlenses arranged two-dimensionally across the lens layer; an optical filter disposed on the lens layer and including a plurality of polymeric layers numbering at least 10 in total, where each of the polymeric layers has an average thickness of less than about 500 nm, such that for a first wavelength in a wavelength range extending from about 420 nm to about 550 nm, a second wavelength in a wavelength range extending from about 600 nm to about 1500 nm, and for each of first and second orthogonal polarization states, the optical filter has: an optical transmission of greater than about 50% for the first wavelength for each of a first incident angle of less than about 10 degrees and a second incident angle of greater than about 30 degrees, and for the second wavelength, an optical transmission of less than about 15% for the first incident angle and an optical transmission of greater than about 30% for the second incident angle. The optical construction includes an optically opaque mask layer disposed between the lens layer and the optical filter and defining a plurality of openings therein, where the openings in a one-to-one correspondence with the microlenses and regions of the mask layer between the openings have an optical density of greater than about 2 for each of the first and second wavelengths; and a low index layer disposed on the optical filter. The low index layer can have a sufficiently low index of refraction at the second wavelength so that light having the second wavelength and incident on the low index layer at the second incident angle undergoes total reflection. The optical construction is an integral construction.

In some aspects of the present description, an optical construction is provided. The optical construction includes a lens layer having an outermost structured first major surface and an opposing outermost substantially planar second major surface, where the structured first major surface includes a plurality of microlenses arranged along orthogonal first and second directions; an optically opaque mask layer disposed on the second major surface of the lens layer, where the mask layer defines a plurality of through openings therein arranged along the first and second directions, and where the through openings are aligned to the microlenses in a one-to-one correspondence; a low index layer disposed on a major surface of the mask layer and at least partially filling the through openings; and an optical filter disposed on the low index layer, such that for an incident light, a visible first wavelength and an infrared second wavelength, and a first incident angle less than about 10 degrees and a second incident angle greater than about 30 degrees: for each of the first and second wavelengths, the lens layer substantially transmits the incident light for each of the first and second incident angles; for the first incident angle, the optical filter substantially transmits the first wavelength and substantially blocks the second wavelength; for the second incident angle, the optical filter substantially blocks the first wavelength and substantially transmits the second wavelength; for the first incident angle, the low index layer substantially transmits the first and second wavelengths; and for the second incident angle, the low index layer substantially reflects at least the second wavelength.

In some aspects of the present description, an optical construction is provided. The optical construction includes a lens layer having an outermost structured first major surface and an opposing outermost substantially planar second major surface, where the structured first major surface includes a plurality of microlenses arranged along orthogonal first and second directions; an optically opaque mask layer disposed on the second major surface of the lens layer, where the mask layer defines a plurality of through openings therein arranged along the first and second directions, and where the through openings aligned to the microlenses in a one-to-one correspondence; a low index layer disposed on a major surface of the mask layer and at least partially filling the through openings; and an optical filter disposed on the low index layer and substantially blocking light in a predetermined wavelength range at a first incident angle $\theta_1$ and substantially transmitting light in the predetermined wavelength range at a second incident angle $\theta_2$. The predetermined wavelength range can be at least 100 nm wide and can be disposed between about 600 nm and about 1500 nm. A critical angle for light incident on the low index layer from the lens layer and having a first wavelength in the predetermined wavelength range is $\theta_c$, where $\theta_2 > \theta_c > \theta_1$.

In some aspects of the present description, an optical construction is provided. The optical construction includes a collimating optical element having a refractive index n1 at a first wavelength in a predetermined wavelength range at least 100 nm wide and disposed between about nm and about 1500 nm; an optical filter disposed on the collimating optical element; a low index layer disposed on the optical filter, where the low index layer has a refractive index n2 at the first wavelength and where $1.005 < n2 < n1-0.05$. The optical filter can have first and second average transmittances T1 and T2 in the predetermined wavelength range at respective first and second incident angles $\theta_1$ and $\theta_2$, where $T1 < 20\%$ and $T2 > 40\%$. A critical angle for light incident on the low index layer from the collimating optical element and having a first wavelength in the predetermined wavelength range is $\theta_c$, where $\theta_2 > \theta_c > \theta_1$.

These and other aspects will be apparent from the following detailed description. In no event, however, should this brief summary be construed to limit the claimable subject matter.

DETAILED DESCRIPTION

In the following description, reference is made to the accompanying drawings that form a part hereof and in which various embodiments are shown by way of illustration. The drawings are not necessarily to scale. It is to be understood that other embodiments are contemplated and may be made without departing from the scope or spirit of the present description. The following detailed description, therefore, is not to be taken in a limiting sense.

According to some embodiments, an optical construction can include a lens layer including a microlens array, a mask layer having an array of through openings corresponding to the microlenses, and an optical filter. The optical construction may be used as collimating optics for a sensor array, for example. The optical filter can be included to reduce ambient light noise and may be configured to block (e.g., reflect) infrared light, for example. The optical filter can be or include a multilayer optical film that can have a band edge that shifts with incident angle which may reduce the blocking of (e.g., infrared) light at high incident angles. Often, collimation optics introduces (or leaks) some high angle light from internal scattering, for example, which can be more difficult to be filtered out by the optical filter. However, it has been found that a low refractive index layer (e.g., disposed between the lens layer and the optical filter or disposed on the optical filter opposite the lens layer) can be included to reduce the high-angle light incident on the optical filter via total internal reflection (TIR). This can result in reduced cross-talk (light from one microlens transmitted through a through opening aligned with a different microlens). In some embodiments, the optical constructions are useful as angular optical filters which can be used in a variety of applications such as fingerprint sensing applications, for example. The optical construction may be disposed between a fingerprint sensing area and a sensor in a device (e.g., cell phone) and can be adapted to transmit light reflected from a finger in the fingerprint sensing area to the sensor while rejecting light incident on the optical construction from different angles. Various devices in which an optical construction of the present description can be included are described in U.S. Pat. Appl. Nos. 2007/0109438 (Duparre et al.), 2008/0005005 (He et al.), and 2018/00129069 (Chung et al.), for example.

Figure 1A:
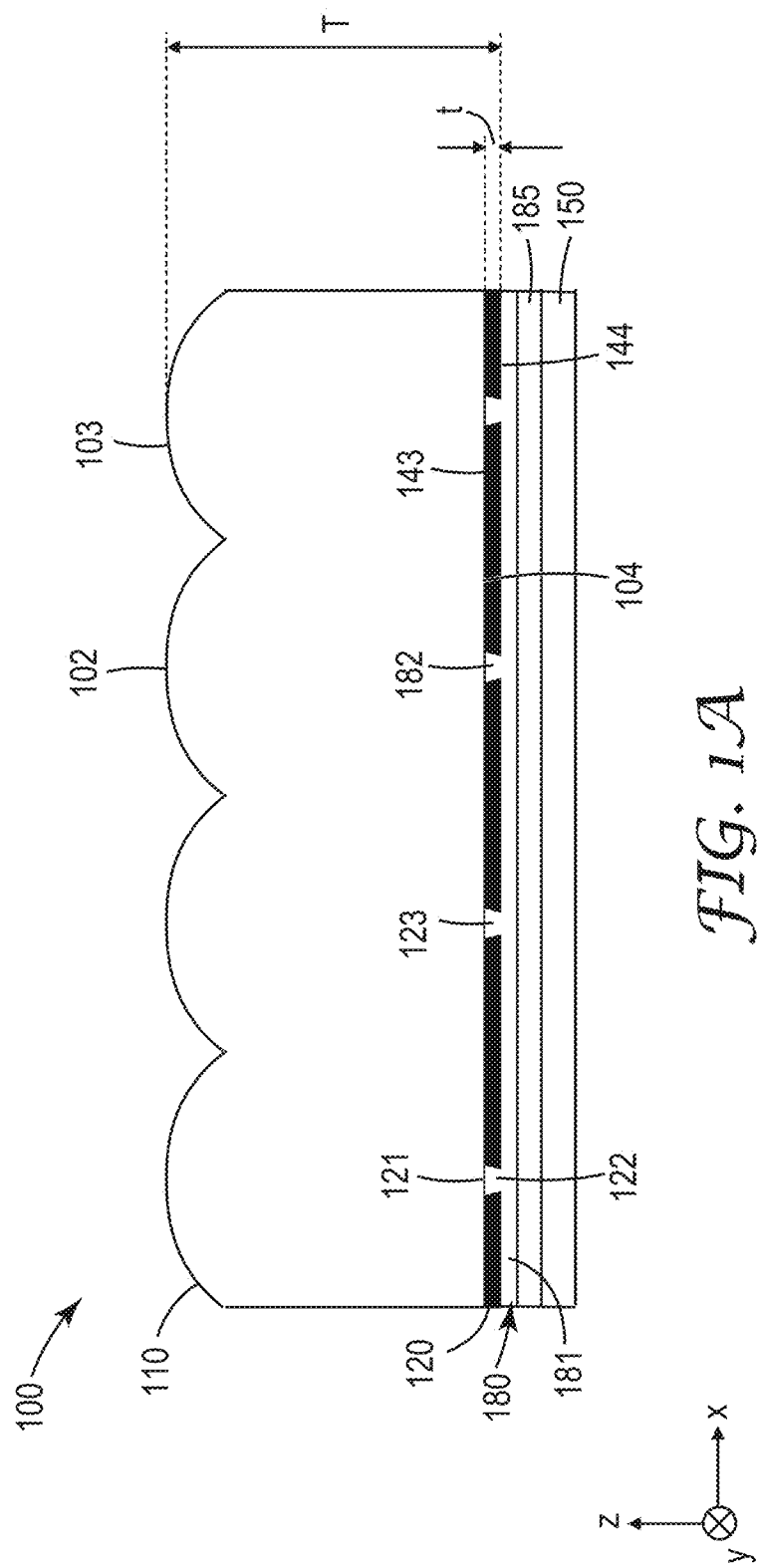
FIGS. 1A-1B are schematic cross-sectional views of an optical construction, according to some embodiments.
Figure 1B:
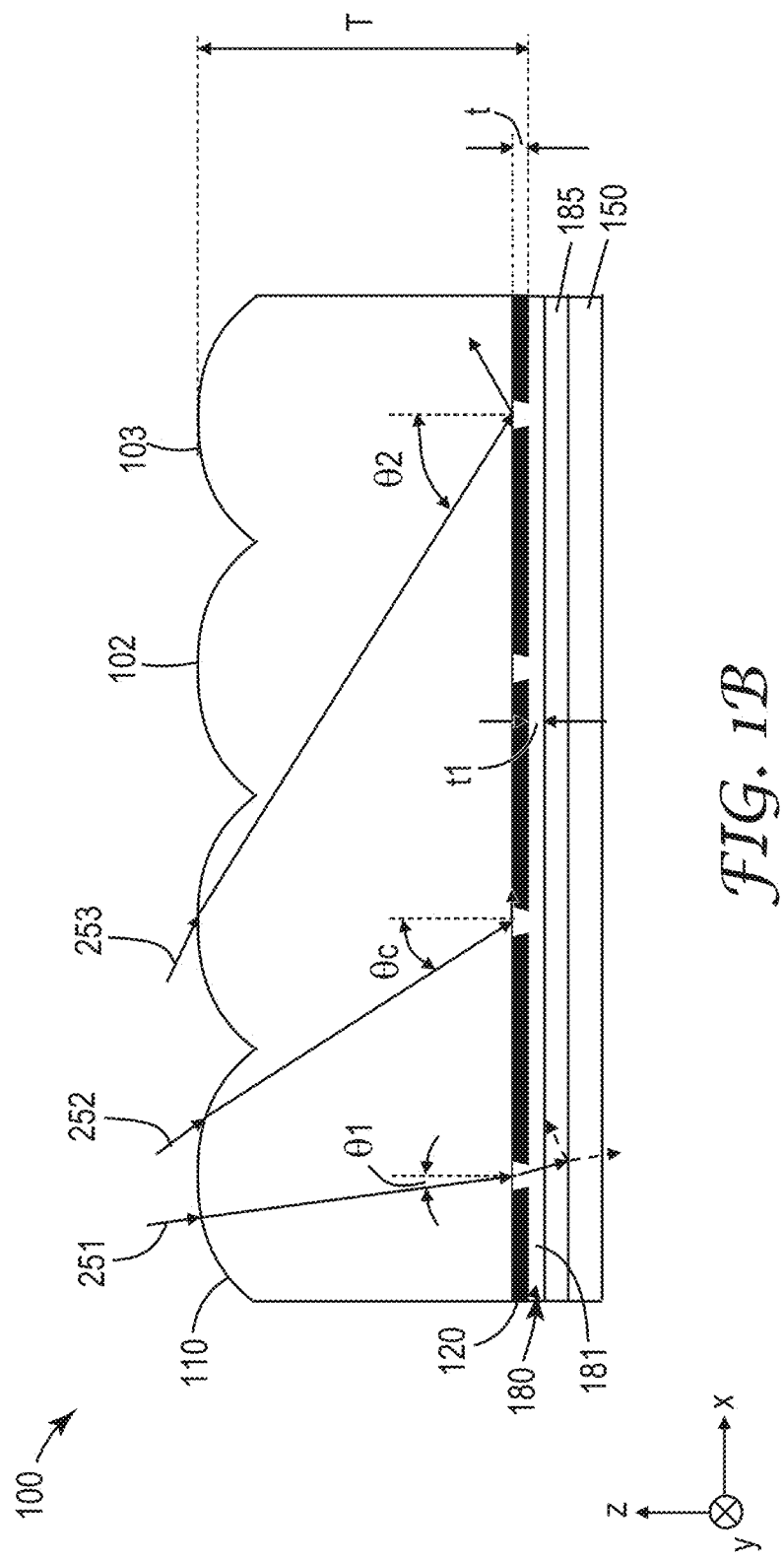
Figure 2:
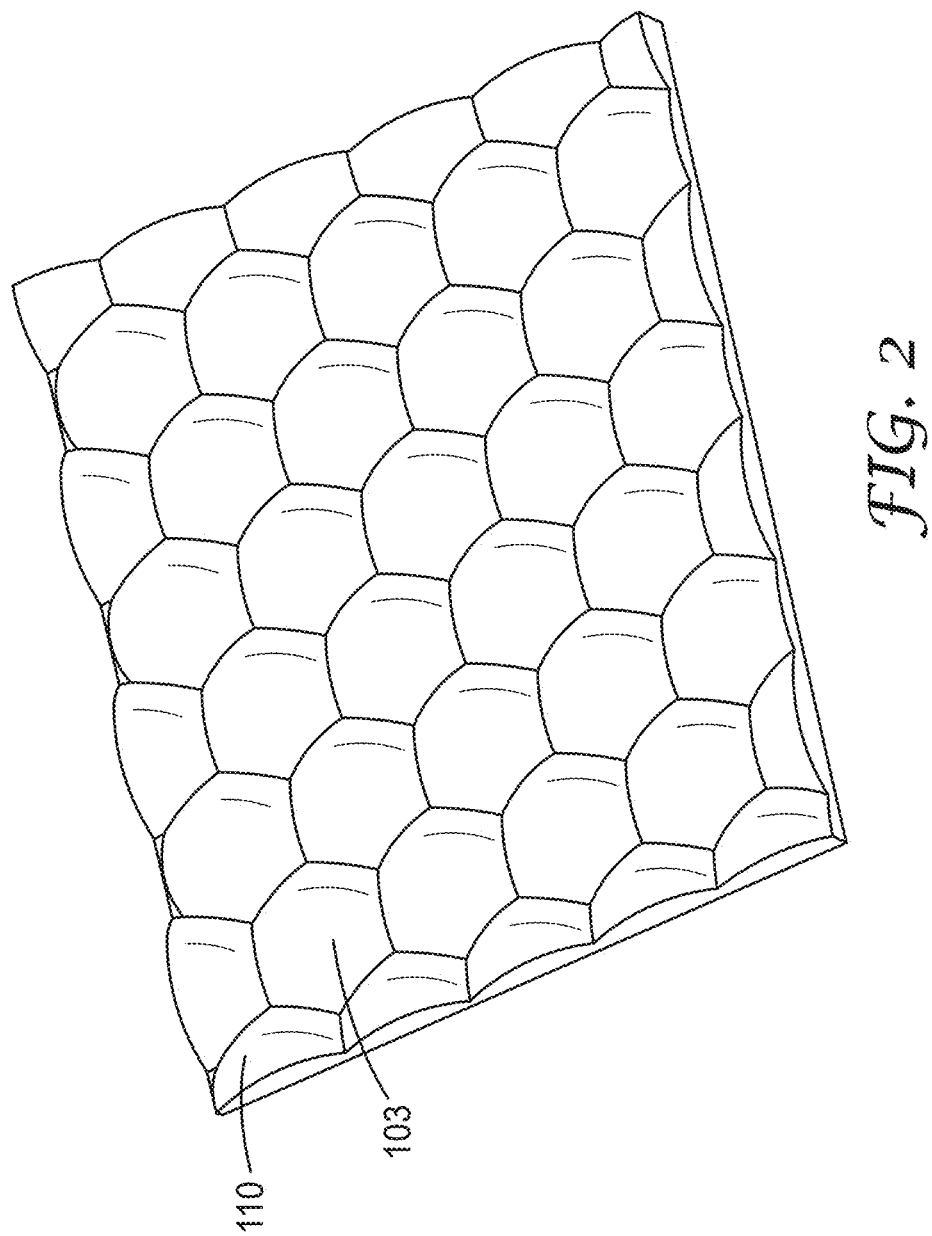
FIG. 2 is a schematic top perspective view of a lens layer, according to some embodiments.
Figure 3:
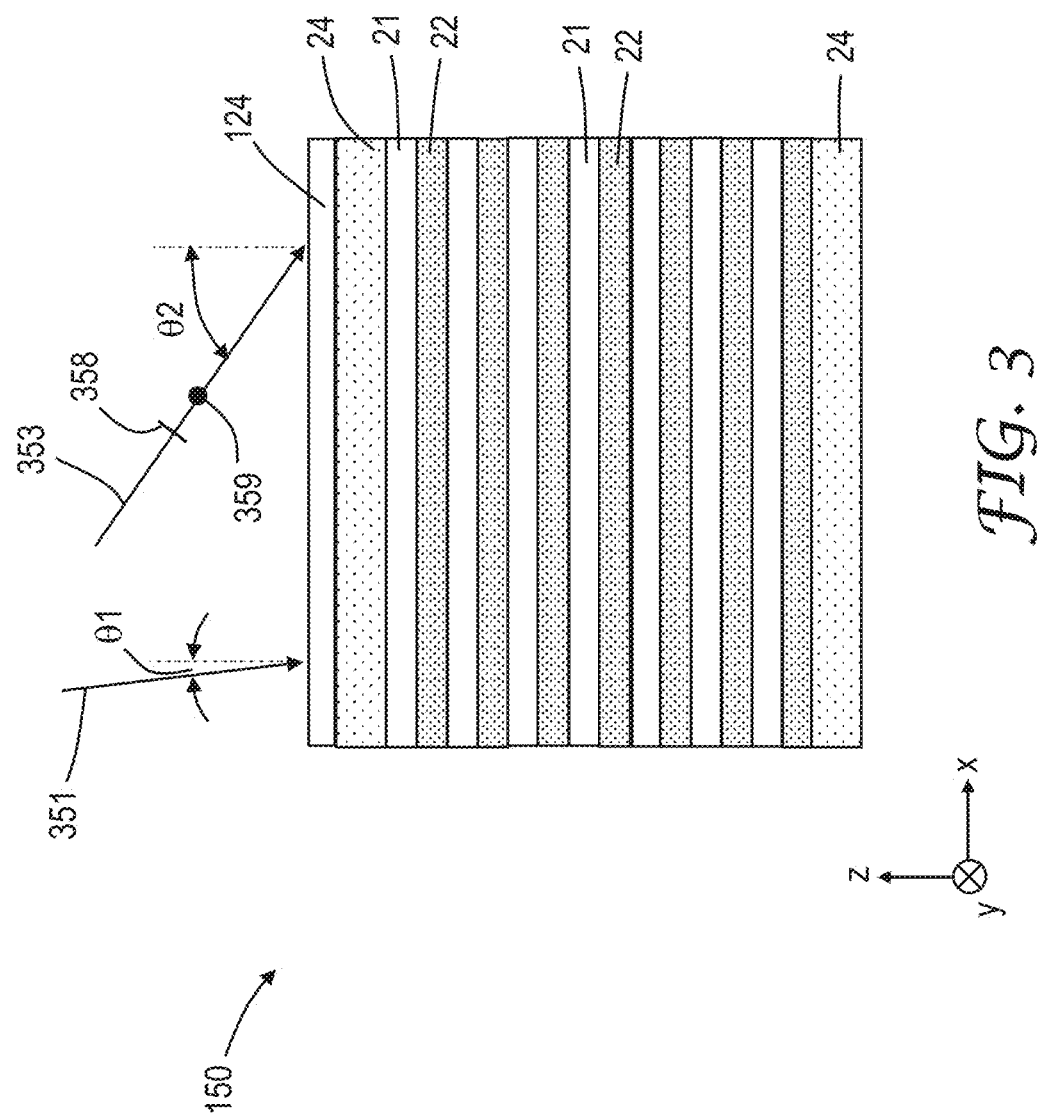
FIG. 3 is a schematic cross-sectional view of an optical filter, according to some embodiments.

FIGS. 1A-1B are schematic cross-sectional views of an optical construction 100, according to some embodiments. The optical construction 100 includes a lens layer 110, a mask layer 120, a low index layer 180, and an optical filter 150. FIG. 2 is a schematic top perspective view of a lens layer 110, according to some embodiments. The lens layer 110 can include microlenses arranged two-dimensionally across the lens layer 110, which can define a plane (x-y plane) of the lens layer 110. The mask layer 120 include a plurality of openings 123 which are typically through openings that may be at least partially filled with a low index material. FIG. 3 is a schematic cross-sectional view of an optical filter 150, according to some embodiments. In some embodiments, the lens layer 110 and the low index layer 180 have respective refractive indices n1 and n2 (e.g., at the wavelength λ3 schematically illustrated in FIG. 4), where $1.005 < n2 < n1 - 0.05$, or $1.01 < n2 < n1 - 0.075$, or $1.02 < n2 < n1 - 0.1$, or $1.03 < n2 < n1 - 0.15$, for example. Generally, when the low index layer includes a material other than air, the low index layer will have a refractive index substantially greater than that of air (e.g., n2 can be greater than 1.005). Typically, it is desired that the low index layer have a sufficiently low refractive index to result in total internal reflection at a desired angle of incidence. The low index layer may have a refractive index n2 of less than about 1.35, 1.3, 1.25, or 1.2 at the wavelength λ3, for example. Nanovoided polymeric layers, for example, can have a refractive index in these ranges. The lens layer 110 may have a refractive index n1 of greater than about 1.4, 1.45, 1.5, 1.55, or 1.6 at the wavelength λ3, for example. The refractive index n1 may be less than about 2, 1.9, or 1.8 at the wavelength λ3, for example. Suitable materials for the lens layer 110 to provide such refractive indices include polymeric materials such as acrylates, for example.

A microlens is generally a lens with at least two orthogonal dimensions (e.g., a height and a diameter, or a diameter along two axes) less than about 1 mm and greater than about 100 nm. The microlenses can have an average diameter in a range of about 0.5 microns to about 500 microns, or about 5 microns to about 100 microns, for example. The microlenses can have an average radius of curvature in a range of 5 microns to 50 microns, for example. The microlenses can have any suitable shape. The microlenses can be spherical or aspherical microlenses, for example. In some embodiments, the microlenses are pillow lenses which can allow for a higher fraction of the area covered by the lenses to be optically active, for example. A pillow lens may be substantially symmetric under reflection about two orthogonal planes (e.g., planes passing through a center of the lens and parallel to the x-z plane and the y-z plane, respectively), or about three planes parallel to the thickness direction of the lens film where each plane makes an angle of about degrees with each other plane, without being rotationally symmetric about any axis.

The mask layer 120 can have an average thickness t of less than about 10 microns, for example. The average thickness t can be in a range of about 2 microns to about 7 microns or about 2.5 microns to about 6 microns, for example, for polymeric mask layers, or can be in a range of 0.005 to 0.5 micrometers, or 0.01 to 0.2 micrometers, for example, for metallic mask layers. The average refers to the unweighted mean unless indicated differently. The mask layer has opposing major surfaces 143 and 144. The average thickness may alternatively be referred to as the average spacing between the major surfaces 143 and 144. In some embodiments, the through openings 123 have an average diameter in a range of about 1 micron to about 10 microns, or about 2 microns to about 8 microns. The diameter of a through opening can be understood to be the diameter of a cylinder having a length equal to the thickness t and having a volume equal to the volume of the through opening. The average diameter is the diameter averaged (unweighted mean) over the through openings. In some embodiments, for at least one of the major surfaces 143 and 144, the open ends at the major surface (e.g., open ends 121 at major surface 143 or open ends 122 at major surface 144) have an average diameter in a range of about 1 micron to about 10 microns, or about microns to about 8 microns. The diameter of an open end can be understood to be the diameter of a circle having a same area as the open end. The average diameter of the open ends is the diameter averaged (unweighted mean) over the open ends. In some embodiments, $0.5 \le d/t \le 2$, where d is the average diameter of the through openings or the average diameter of the open ends at a major surface of the mask layer and t is the average thickness of the mask layer.

In some embodiments, a total thickness T of the lens layer 110 and the mask layer 120 is no greater than about 100 micrometers (e.g., in a range of about 20 micrometers to about 100 micrometers, or about 30 micrometers to about 80 micrometers). The lens layer 110 can include a layer cast and cured on a substrate, for example, so that the thickness of the lens layer is the combined thickness of the cast and cured layer and the substrate. The cast and cured layer can be an acrylate or methacrylate layer, for example. The substrate can be a polyester substrate, for example, such as a polyethylene terephthalate (PET) substrate. In embodiments where the lens layer includes a cast and cured layer on a substrate, the refractive index of the lens layer, when compared with the refractive index of the low index layer, can be understood to refer to an index of the substrate since the substrate is typically adjacent the low index layer. In some embodiments, the cast and cured layer and the substrate each have similar refractive indices (e.g., each having an in-plane refractive index in a range of 1.6 to 1.75 at a wavelength of about 532 nm) while the low index layer has a substantially lower refractive index (e.g., no more than 1.35 at a wavelength of about 532 nm). The lens layer 110 can have a substantially planar (e.g., planar or nominally planar or planar up to variations or curvature small compared to that of the structured major surface 102) major surface 104 opposite the structured major surface 102.

The lens layer 110 can be formed by any suitable process such as by casting and curing a resin between a substrate and a tool (such cast and cure methods are described in U.S. Pat. No. 5,175,030 (Lu et al.) and U.S. Pat. No. 5,183,597 (Lu) and in U.S. Pat. Appl. Pub. No. 2012/0064296 (Walker, J R et al.), for example), or by machining or molding unitary layer, for example. The mask layer can be a metal (e.g., aluminum) layer deposited onto the lens layer 110 or can be a polymeric layer including optically absorptive material (e.g., carbon black) dispersed in a polymer, for example. The mask layer 120 can be formed by coating a black ink onto the lens layer 110, for example. Through openings 123 in the mask layer 120 can be formed via laser ablation through the lens layer 110. The shapes of the through openings (e.g., trapezoidal, inverse-trapezoidal, cylindrical) can be adjusted via laser processing conditions as generally described in in U.S. Pat. No. 7,864,450 (Segawa et al.), for example. Methods of making related optical constructions are described in International Appl. Pub. No. WO 2021/255596 (Markowicz) and in U.S. Pat. Appl. Pub. No. 2021/0271003 (Yang et al.), for example. The lens layer 110 can include other elements or features of the corresponding lens layer or lens film of these references. The low index layer can then be disposed (e.g., coated) onto the mask layer 120 and the optical filter 150 can be bonded to the low index layer 180 directly or through an optional adhesive layer 185. Alternatively, the optical filter can be bonded to the mask layer and the low index layer can be coated onto optical filter opposite the mask layer.

Figure 4:
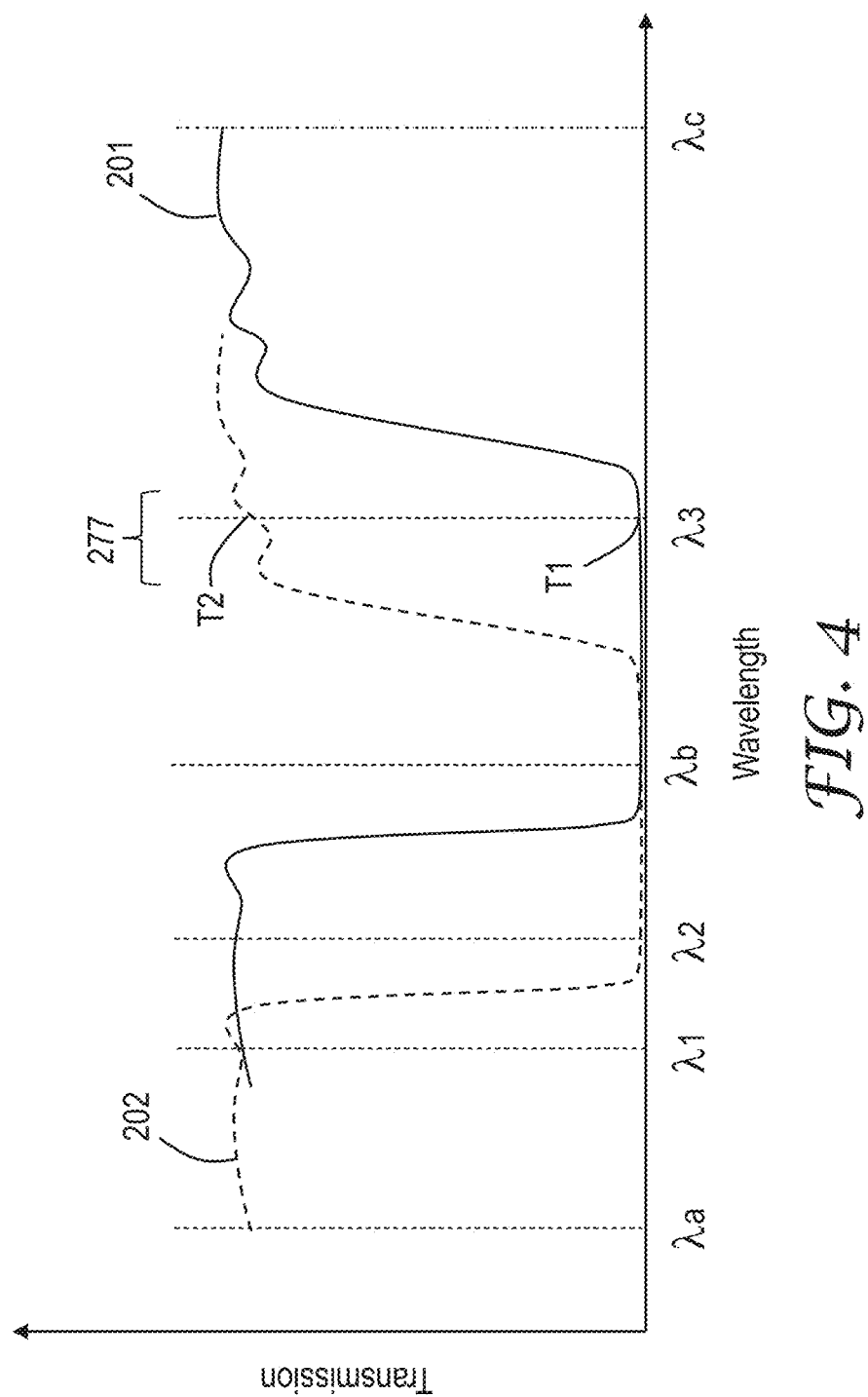
FIG. 4 is a schematic plot of optical transmission through an optical filter, according to some embodiments.

FIG. 4 is a schematic plot of optical transmission 201, 202 through an optical filter 150, according to some embodiments. Optical transmission 201 is for a lower incident angle and optical transmission 202 is for a higher incident angle. FIG. 4 schematically illustrates a (e.g., visible) wavelength range from $\lambda a$ to $\lambda b$ and a (e.g., near-infrared) wavelength range from $\lambda b$ to $\lambda c$. $\lambda a$ may be about 400 nm or about 420 nm, for example. $\lambda b$ may be about 600 nm, or about 650 nm, or about 680 nm, about 700 nm, or about 720 nm, for example. $\lambda c$ maybe about 1500 nm, about 1200 nm, or about 900 nm, for example. The wavelength $\lambda 1$ can be in a visible wavelength range and the wavelength $\lambda 3$ can be in an infrared wavelength range. The wavelength $\lambda 1$ can be in a wavelength range extending from about 420 nm (e.g., $\lambda a$) to about 550 nm (e.g., $\lambda 2$), for example. The wavelength $\lambda 2$ can be a visible wavelength (e.g., in a range from 420 nm to 700 nm) and the wavelength $\lambda 3$ can be an infrared wavelength (e.g., in a range from 700 nm to 1500 nm, for example). The wavelength $\lambda 3$ can be in a predetermined wavelength range 277 that can be at least nm wide and disposed between about 600 nm (e.g., $\lambda 2$) and about 1500, 1200, or 900 nm (e.g., $\lambda c$), for example. The wavelength $\lambda 3$ can be in a wavelength range extending from about 600 nm, or about 650 nm, or about 700 nm (e.g., $\lambda b$) to about 1500, 1200, or 900 nm (e.g., $\lambda c$), for example. Different names may be used for the wavelengths $\lambda 1$, $\lambda 2$ and $\lambda 3$, depending, for example, on the context. For example, the wavelengths $\lambda 1$, $\lambda 2$ and $\lambda 3$ may be referred to as first, second and third wavelengths, respectively, or one of the wavelengths $\lambda 1$ and $\lambda 2$ may be referred to as a first wavelength and $\lambda 3$ may be referred to as a second wavelength, or the wavelength $\lambda 3$ may be referred to as a first wavelength.

An incident angle is generally an angle between a normal to a layer or component and a direction of an incident light. In the case of a lens layer, the normal to the lens layer can be taken to be along a direction (z-direction) orthogonal to a plane (x-y plane) of the lens layer. In FIG. 1B, light 251, 252, and 253 have respective incident angles $\theta 1$, $\theta c$, and $\theta 2$ with the low index layer 180 where $\theta 2 > \theta c > \theta 1$. The angle $\theta c$ is a critical angle for light incident on the low index layer 180 from the lens layer 110 (i.e., for light incident on the low index layer 180 from the lens layer side of the low index layer. Such light can be incident on the low index layer 180 after passing through the lens layer 110 and any layer(s) that might be between the lens and low index layers). In FIG. 3, first and second light rays 351 and 353 have respective first and second incident angles $\theta 1$ and $\theta 2$ with the optical filter 150 where $\theta 2 > \theta 1$.

Figure 5A:
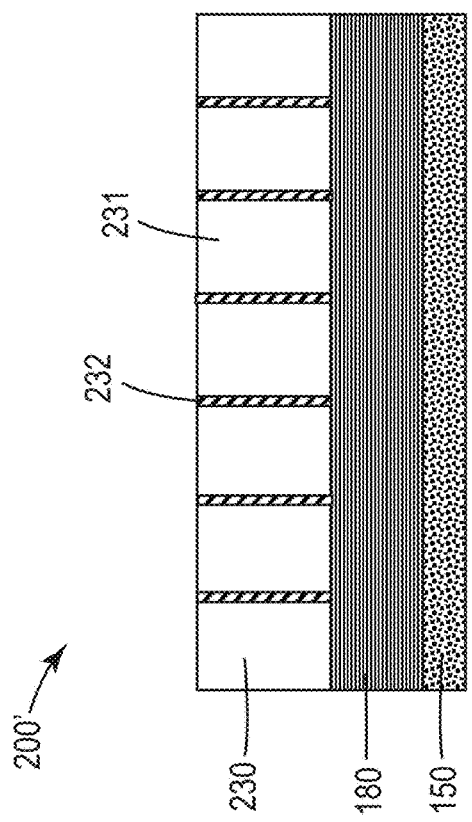
FIGS. 5A-5B are schematic cross-sectional views of optical constructions including a collimating optical element, an optical filter disposed on the collimating optical element, and a low index layer disposed on the optical filter, according to some embodiments.
Figure 5B:
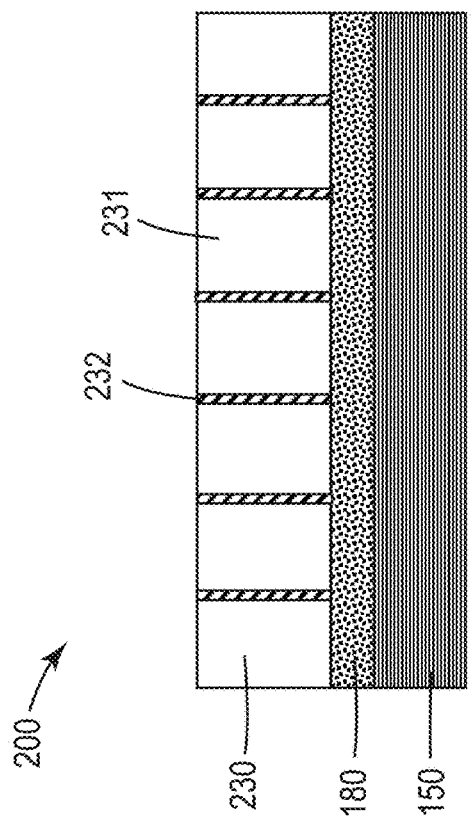

In some embodiments, an integral optical construction 100 includes a lens layer 110 having a structured first major surface 102 including a plurality of microlenses 103 arranged two-dimensionally (see, e.g., FIG. 2) across the lens layer 110; an optical filter 150 disposed on the lens layer 110 and including a plurality of polymeric layers 21, 22 (see, e.g., FIG. 3) numbering at least (or in a range described elsewhere herein) in total where each of the polymeric layers has an average thickness of less than about 500 nm (or in a range described elsewhere herein), such that for a first wavelength $\lambda 1$ in a wavelength range (e.g., $\lambda a$ to $\lambda 2$) extending from about 420 nm to about 550 nm, a second wavelength $\lambda 3$ in a wavelength range extending from about 600 nm or about 650 nm or about 700 nm to about 1500 nm (e.g., $\lambda b$ to $\lambda c$), and for each of first and second orthogonal polarization states (e.g., polarization states 358 and 359 schematically illustrated in FIG. 3), the optical filter has: an optical transmission of greater than about 50% for the first wavelength for each of a first incident angle $\theta 1$ of less than about 10 degrees and a second incident angle $\theta 2$ of greater than about 30 degrees; and for the second wavelength $\lambda 3$, an optical transmission of less than about 15% for the first incident angle $\theta 1$ and an optical transmission of greater than about 30% for the second incident angle $\theta 2$. The optical construction includes an optically opaque mask layer 120 disposed between the lens layer 110 and the optical filter 150 and defining a plurality of openings 123 therein, where the openings are in a one-to-one correspondence with the microlenses 103; and a low index layer 180 disposed on the optical filter (e.g., disposed between the mask layer 120 and the optical filter 150 as schematically indicated in FIG. 1A-1B or 5A, or disposed on a side of the optical filter opposite the mask layer as schematically indicated in FIG. 5B, for example). The low index layer 180 can have a sufficiently low index of refraction (e.g., less than about 1.35 or in a range described elsewhere herein) at the second wavelength λ3 so that light having the second wavelength and incident on the low index layer at the second incident angle undergoes total reflection. Alternatively, or in addition, the low index layer 180 can have a sufficiently low index of refraction (e.g., less than about 1.35 or in a range described elsewhere herein) at the first wavelength λ1 so that light having the first wavelength and incident on the low index layer at the second incident angle undergoes total reflection. The light can be incident on the low index layer 180 from the lens layer 110 and can reflect from the low index layer via total internal reflection as schematically illustrated in FIG. 1B for light 253.

The optical construction 100 can be an integral construction. As used herein, an "integral construction" is a construction where each layer of the construction is immediately adjacent and attached to an adjacent layer of the construction. Any of the optical constructions described herein can be an integral construction.

In some embodiments, regions of the mask layer 120 between the openings 123 have an optical density of greater than about 2, or 2.5, or 3, or 3.5, or 4, or 4.5, or 5, or 5.5, or 6 for each of the first and second wavelengths λ1 and λ3. The optical density can be expressed as minus the base 10 logarithm of [transmittance/100%], where the transmittance (in %) is for unpolarized normally incident light at an indicated wavelength, unless indicated differently. The optical density can be increased by increasing the thickness of the mask layer 120 and/or by increasing a concentration of light absorbing material in the mask layer (e.g., increasing the concentration of carbon black or other pigments/dyes in a black ink), for example.

In some embodiments, the optical filter has an optical transmission of greater than about 50, or 55, or 60, or 70, or 75 percent for the first wavelength λ1 for each of the first incident angle θ1 and the second incident angle θ2. In some such embodiments, or in other embodiments, for the second wavelength λ3, the optical filter 150 has an optical transmission (e.g., T1 of FIG. 4) of less than about 15, or 10, or 5, or 2, or 1 percent for the first incident angle θ1. In some such embodiments, or in other embodiments, for the second wavelength λ3, the optical filter 150 has an optical transmission (e.g., T2 of FIG. 4) of greater than about 30, or 35, or 40, or 45, or 50 percent for the second incident angle θ2. The first incident angle θ1 can be less than about 10, or 8, or 6, or 4, or 2, or 1 degrees, for example. The second incident angle θ2 can be greater than about 30, or 35, or 40, or 45, or 50 degrees, for example. In some embodiments, the second incident angle θ2 is less than about 80, 70, 65, or 60 degrees, for example. In some embodiments, 80 degrees <θ2<θ1≤0 degrees, for example.

In some embodiments, the lens layer 110 and the low index layer 180 have respective refractive indices n1 and n2 at the second wavelength λ3, where 1.005<n2<n1-0.05, or n1 and n2 can be in any of the ranges described elsewhere herein. In some embodiments, the second wavelength λ3 is in a wavelength range extending from about 600 nm to about 1500 nm or to about 1200 nm, or from about 650 nm to 1200 nm or to about 900 nm, or from about 700 nm to nm or to about 900 nm for example. In some embodiments, the low index layer 180 has a sufficiently low index of refraction at the wavelength λ3 so that light having the wavelength λ3 and incident on the low index layer 180 from the lens layer 110 at the second incident angle θ2 undergoes total internal reflection at an interface between the lens layer 110 and the low index layer 180.

In some embodiments, an optical construction 100 includes a lens layer 110 having an outermost structured first major surface 102 and an opposing outermost substantially planar second major surface 104, where the structured first major surface 102 includes a plurality of microlenses arranged along orthogonal first and second directions (x- and y-directions); an optically opaque mask layer 120 disposed on the second major surface 104 of the lens layer, where the mask layer 120 defines a plurality of through openings 123 therein arranged along the first and second directions and where the through openings 123 are aligned to the microlenses 103 in a one-to-one correspondence; a low index layer 180 disposed on a major surface 144 of the mask layer and at least partially filling the through openings 123; and an optical filter 150 disposed on the low index layer, such that for an incident light (e.g., 251 and 253), a visible first wavelength λ2 and an infrared second wavelength λ3, and a first incident angle θ1 less than about 10 degrees and a second incident angle θ2 greater than about 30 degrees: for each of the first and second wavelengths, the lens layer substantially transmits the incident light for each of the first and second incident angles; for the first incident angle θ1, the optical filter substantially transmits the first wavelength λ2 and substantially blocks (e.g., reflects) the second wavelength λ3; for the second incident angle θ2, the optical filter substantially blocks (e.g., reflects) the first wavelength λ2 and substantially transmits the second wavelength λ3; for the first incident angle θ1, the low index layer substantially transmits the first and second wavelengths; and for the second incident angle θ2, the low index layer substantially reflects at least the second wavelength.

The low index layer 180 can substantially fill (e.g., fill greater than 50, 60, 70, 80, or 90 percent of a total volume of) the through openings 123. In some embodiments, the low index layer entirely fills the through openings 123.

Substantially transmitting light can be understood to mean transmitting greater than 50% of the light. Substantially blocking or reflecting light can be understood to mean blocking or reflecting, respectively, greater than 50% of the light. In some embodiments, a layer or element that substantially transmits light, transmits at least about 60, 70, or 80 percent of the light. In some embodiments, a layer or element that substantially blocks or reflects light, blocks or reflects, respectively, at least about 60, 70, or 80 percent of the light. The optical filter 150 can block the first wavelength λ2 by reflecting light having the first wavelength, by absorbing the light, or by a combination of partially reflecting and partially absorbing the light (e.g., via an optically absorbing layer disposed on a reflective multilayer film as described elsewhere herein).

In some embodiments, for the second incident angle θ2, the low index layer 180 substantially reflects the first wavelength λ2 (e.g., via TIR). In some embodiments, the lens layer and the low index layer 180 have respective refractive indices n1 and n2 at the second wavelength λ3, where n2<n1-0.05, or n1 and n2 can be in any of the ranges described elsewhere herein.

In some embodiments, regions of the mask layer 120 between the openings 123 have an optical density of greater than about 2 for each of the first and second wavelengths λ2 and λ3, or the optical density can be in any of the ranges described elsewhere herein. In some embodiments, the first wavelength λ2 is in a visible wavelength range extending from about 420 nm to about 550 nm; and the second wavelength λ3 is in a wavelength range extending from about 600 nm to about nm, or about 650 nm to about 1200 nm, or about 650 nm to about 900 nm, for example. In some such embodiments, or in other embodiments, the second wavelength λ3 is in an infrared wavelength range extending from about 700 nm to about 1200 nm or to about 900 nm, for example.

In some embodiments, an optical construction 100 including a lens layer 110 having an outermost structured first major surface 102 and an opposing outermost substantially planar second major surface 104 where the structured first major surface 102 includes a plurality of microlenses arranged along orthogonal first and second directions (x- and y-directions); an optically opaque mask layer 120 disposed on the second major surface 104 of the lens layer 110 where the mask layer 120 defines a plurality of through openings 123 therein arranged along the first and second directions and where the through openings 123 are aligned to the microlenses 103 in a one-to-one correspondence; a low index layer 180 disposed on a major surface of the mask layer 120 (e.g., on the major surface 144 of the mask layer 120 facing the optical filter 150) and at least partially filling the through openings 123; and an optical filter 150 disposed on the low index layer and substantially blocking light in a predetermined wavelength range 277 (e.g., blocking greater than 50, 60, 70, 80, or 90 percent of light for each wavelength in the predetermined wavelength range 277) at a first incident angle θ1 and substantially transmitting light in the predetermined wavelength range 277 (e.g., transmitting greater than 50, 60, 70, 75, or 80 percent of light for each wavelength in the predetermined wavelength range 277) at a second incident angle θ2. The predetermined wavelength range 277 can be at least 100 nm wide and disposed between about 600 nm (e.g., λb of FIG. 4) and about 1500 nm (e.g., λc of FIG. 4). A critical angle for light incident on the low index layer from the lens layer and having a first wavelength (e.g., λ3) in the predetermined wavelength range 277 is θc, where θ2>θc>θ1. In some embodiments, θ2−2 degrees >θc>θ1+2 degrees, or θ2−5 degrees >θc>θ1+5 degrees, or θ2−10 degrees >θc>θ1+10 degrees. In some embodiments, the lens layer 110 and the low index layer 180 have respective refractive indices n1 and n2 at the first wavelength, where n2<n1−0.05, or n1 and n2 can be in a range described elsewhere herein. The predetermined wavelength range 277 can be from about 600 nm to about 1500 nm, or about 650 nm to about 1200 nm, or about 700 nm to about 1000 nm, or about 800 nm to about 900 nm, for example.

In some embodiments, the low index layer 180 is or includes a nanovoided polymeric layer (e.g., as schematically indicated in FIGS. 5A-5B). Nanovoided polymeric layers are described in U.S. Pat. No. 9,464,179 (Kolb et al.); U.S. Pat. No. 10,293,370 (Haag et al.) and in U.S. Pat. Appl. Pub. No. 2017/0368569 (Wolk et al.), for example. In some embodiments, the low index layer 180 is or includes a fluoropolymer layer.

The low index layer may be substantially coextensive (e.g., in area and/or in each of length and width) with at least one of the lens layer or the optical filter. In some embodiments, the low index layer 180 includes a first portion 181 disposed on and substantially coextensive with the mask layer 120 and a second portion 182 at least partially filling the through openings 123 and contacting the lens layer 110. In some embodiments, the first portion 181 is a land portion having an average thickness t1 less than about 5, 4, 3, 2, or 1 times the first wavelength (e.g., λ3). The average thickness t1 can be at least about 10, 25, 50, or 100 nm, for example. The low index layer can be a nanovoided polymeric layer and may have a gradient in refractive index such that the portion 182 of the nanovoided layer facing the lens layer 110 has a lower refractive index than the land portion 181. For example, the nanovoids of the land portion can be at least partially filled resulting in a higher refractive index for the land portion than the portion at least partially filling the through openings 123. A nanovoided polymeric layer with a gradient in refractive index can be made as described in U.S. Pat. No. 10,293,370 (Haag et al.), for example. In some embodiments, the lens layer 110 and the second portion 182 of the low index layer 180 have respective refractive indices n1 and n2 at the first wavelength, where n2<n1−0.05, or 1.005<n2<n1−0.05, or 1.01<n2<n1−0.075, or 1.02<n2<n1−0.1, or 1.03<n2<n1−0.15, for example.

The optical filter 150 can be or include a multilayer optical film. As is known in the art, multilayer optical films including alternating polymeric layers can be used to provide desired reflection and transmission in desired wavelength ranges by suitable selection of layer thicknesses and refractive index differences. Multilayer optical films and methods of making multilayer optical films are described in U.S. Pat. No. 5,882,774 (Jonza et al.); U.S. Pat. No. 6,783,349 (Neavin et al.); U.S. Pat. No. 6,949,212 (Merrill et al.); U.S. Pat. No. 6,967,778 (Wheatley et al.); and U.S. Pat. No. 9,162,406 (Neavin et al.), for example.

In some embodiments, the optical filter 150 includes a plurality of polymeric layers 21, 22. The plurality of polymeric layers 21, 22 can include a plurality of alternating first (21) and second (22) polymeric layers. In some embodiments, the plurality of polymeric layers 21, 22 number at least 10, or 20, or 50, or 100, or 150, or 200, or 250, or 300 in total. The plurality of polymeric layers 21, 22 can number up to 2000, 1500, 1000, or 800, for example. In some embodiments, each of the polymeric layers 21, 22 has an average thickness of less than about 500, or 450, or 400, or 350, or 300, or 250, or 200 nm. Each of the polymeric layers 21, 22 can have an average thickness of greater than 10, 20, 30, 40, or 50 nm, for example. The optical filter 150 can further include skin layers 24 with the plurality of polymeric layers 21, 22 disposed between the skin layers. Each of the skin layers can have an average thickness of greater than about 500, 750, 1000, 1500, or 2000 nm, for example. The average thickness of each of the skin layers can be up to about 40, 30, 20 or microns, for example.

The optical filter can include one or more optional additional layers. Optional additional layer(s) 124, which can be disposed on either one or both sides of the optical filter 150, can be or include a vapor deposited metal layer or an infrared absorbing layer. The layer 124 can be included to aid the plurality of layers 21, 22 in blocking infrared light and/or to extend the wavelength range where the optical filter 150 blocks infrared light. Vapor deposited metal layers are known in the art and include those described in U.S. Pat. No. 9,568,653 (O'Neill et al.), for example. Infrared absorbing layers are known in the art and include those described in U.S. Pat. No. 10,745,541 (Kubo et al.), for example.

FIG. 5A are schematic cross-sectional views of optical constructions 200, 200' including a collimating optical element 230, an optical filter 150 disposed on the collimating optical element, and a low index layer 180 disposed on the optical filter 150, according to some embodiments. The collimating optical element 230, which can be a collimating optical film, can be a combination of a lens layer 110 and mask layer 120 or can be other collimating elements such as a louver film or a fiber optics plate. The low index layer 180 can be disposed between the collimating optical element 230 and the optical filter 150 as schematically illustrated in FIG.

5A, or the low index layer 180 can be disposed on a side of the optical filter 150 opposite the collimating optical element 230 as schematically illustrated in FIG. 5B.

In some embodiments, an optical construction 100, 200, 200' includes a collimating optical element 230 having a refractive index n1 at a first wavelength (e.g., λ3) in a predetermined wavelength range at least 100 nm wide and disposed between about 600 nm and about 1500 nm; and an optical filter 150 disposed on the collimating optical film; a low index layer 180 disposed on the optical filter where the low index layer has a refractive index n2 at the first wavelength and where 1.005<n2<n1−0.05 (or n1 and n2 can be in a range described elsewhere herein). The optical filter can have first and second average transmittances T1 and T2 in a predetermined wavelength range 277 at respective first and second incident angles θ1 and θ2, where T1<20%, T2>40%. A critical angle for light incident on the low index layer from the collimating optical element (i.e., for light incident on the low index layer from the collimating optical element side of the low index layer. Such light can be incident on the low index layer after passing through the collimating optical element and any layer(s) that might be between the collimating optical element and the low index layer) and having a first wavelength λ3 in the predetermined wavelength range is θc, where θ2>θc>θ1. In some embodiments, T1<15%, or T1<10%, or T1<5%, or T1<3%, or T1<2%, for example. In some such embodiments, or in other embodiments, T2>50%, or T2>60%, or T2>70%, or T2>75%, or T2>80%, for example.

In some embodiments, the collimating optical element 230 includes a lens layer 110 having a structured first major surface 102 including or defining a plurality of microlenses 103 arranged two-dimensionally across the lens layer 110. In some embodiments, the collimating optical element 230 further includes an optically opaque mask layer 120 disposed between the lens layer 110 and the low index layer 180. The mask layer 120 can define a plurality of openings 123 therein where the openings 123 are in a one-to-one correspondence with the microlenses 103.

In some embodiments, the collimating optical element 230 is or includes a louver film. A louver film, which may be referred to as a light control film, generally includes alternating light transmissive regions and light absorbing louvers. Suitable louver films are known in the art and include those described in U.S. Pat. No. 10,809,445 (Johnson et al.); U.S. Pat. No. 10,761,320 (Sitter et al.); U.S. Pat. No. 9,335,449 (Gaides et al.); U.S. Pat. No. 8,503,122 (Liu et al.); and U.S. Pat. No. 8,213,082 (Gaides et al.), for example.

In some embodiments, the collimating optical element 230 is or includes a fiber optics plate. The fiber optics plate can be made of a collection of optical fiber films bundled with an opaque separator material. Suitable fiber optics plates are known in the art and include those described in U.S. Pat. Appl. No. 2021/0019017 (Yeke Yazdandoost et al.), for example.

The refractive index n1 of the collimating optical element 230 should be understood to refer to the refractive index of an optically transmissive portion of the collimating optical element (e.g., a lens layer, or optically transmissive regions between louvers of a louver film, or optically transmissive fiber cores of an optical fiber plate) unless indicated differently. In the embodiments schematically illustrated in FIGS. 5A-5B, the collimating optical element 230 includes optically transmissive portions 231 (e.g., corresponding to regions between louvers or to fiber cores) between optically absorptive portions 232 (e.g., corresponding to louvers or to optically absorptive material between optical fibers).

The optical filter 150 of the optical construction 200 can be any optical filter described elsewhere herein. For example, in some embodiments, the optical filter 150 includes a plurality of polymeric layers 21, 22 numbering at least 10 (or in a range described elsewhere herein) in total where each of the polymeric layers 21, 22 has an average thickness of less than about 500 nm (or in a range described elsewhere herein). In some embodiments, the optical filter further includes a vapor deposited metal layer and/or an infrared absorbing layer.

Figure 8:
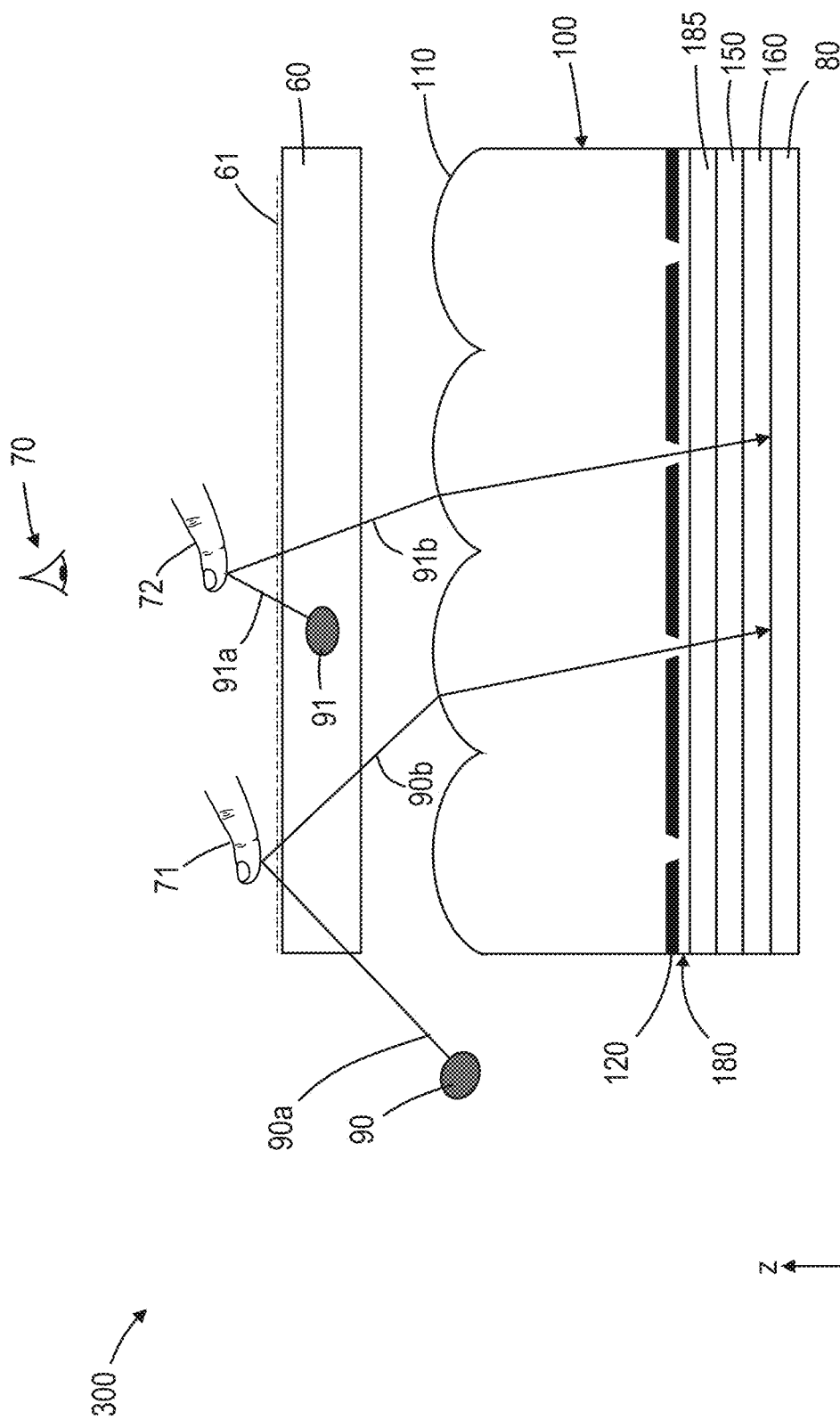
FIG. 8 is a schematic cross-sectional view of a display system, according to some embodiments.

The optical constructions of the present description can be used in a display system as a collimating optical element used with a sensor for fingerprint detection, for example. FIG. 8 is a schematic cross-sectional view of a display system 300, according to some embodiments. In some embodiments, a display system 300 for sensing a finger 71, 72 of a user 70 applied to the display system is provided. The display system 300 includes a display panel 60 disposed on, and substantially coextensive in length (e.g., along x-direction) and width (e.g., along y-direction), with the optical construction 100, 200, 200'. The display panel 60 can be disposed on the optical construction 100, 200, 200' with the lens layer 110 facing the display panel 60. The display panel can be configured to display an image 61 for viewing by the user 70. In some embodiments, the display system 300 further includes an optical sensor 80 for sensing the finger 71, 72 of the user 70, where the optical sensor 80 is disposed on the optical construction 100, 200, 200' opposite the display panel 60. The optical sensor 80 can be configured to receive at least a portion of light 90b, 91b reflected by the finger 71, 72. In some embodiments, the display system can include a (e.g., infrared) light source 90, 91 configured to emit a (e.g., infrared) light 90a, 91a toward the finger 71, 72 of the user. The light 90b, 91b reflected 90b, 91b by the finger 71, 72 can be (e.g., infrared) light emitted from the respective light source 90, 91. In some embodiments, both light sources 90 and 91 are included. In some embodiments, one, but not the other, of the light sources 90 and 91 is included. For example, the display system can rely on light source 90, which may be an infrared light source, for fingerprint sensing. In some embodiments, light from the display panel 60 can be reflected by the finger 72 and used for fingerprint sensing. For example, light source 91 can be provided by the display panel 60 which can be an organic light emitting diode (OLED) display panel, for example. Light source 90 may then optionally be omitted. In some embodiments, the sensor 80 is bonded to the optical construction via an adhesive layer 160.

Layers or elements can be described as substantially coextensive with each other if at least about 60% by area of each layer or element is coextensive with at least about 60% by area of each other layer or element. Here, area refers to the area of a major surface of the layer or element. In some embodiments, for layers or elements described as substantially coextensive, at least about 70%, or at least about 80%, or at least about 90% by area of each layer or element is coextensive with at least about 70%, or at least about 80%, or at least about 90% by area of each other layer or element. In the case of a layer of a plurality of discrete elements, the area of the layer refers to the area within an outer boundary of a region defined by the plurality of discrete elements. Layers or elements can be described as substantially coextensive with each other in length and width if at least about 60% of the length and width of each layer or element is co-extensive with at least about 60% of the length and width of each other layer or element. In some embodiments, for layers or elements described as substantially coextensive with each other in length and width, at least about 70% or at least about 80% or at least about 90% of each layer or element is co-extensive in length and width with at least about 70% or at least about 80% or at least about 90% of the length and width of each other layer or element.

EXAMPLES

Figure 6:
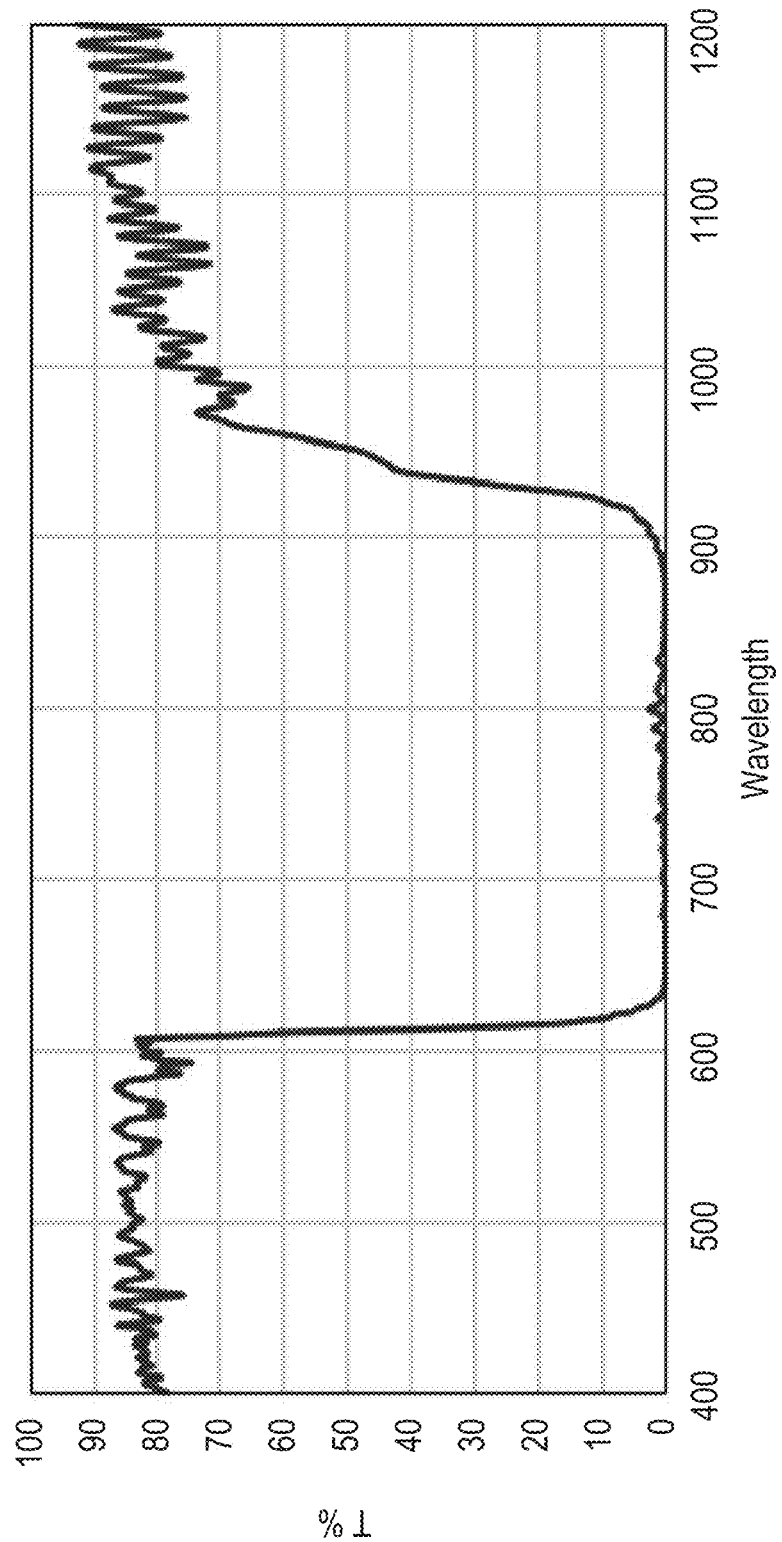
FIG. 6 is a plot of optical transmission through an exemplary optical filter for normally incident light, according to some embodiments.
Figure 7:
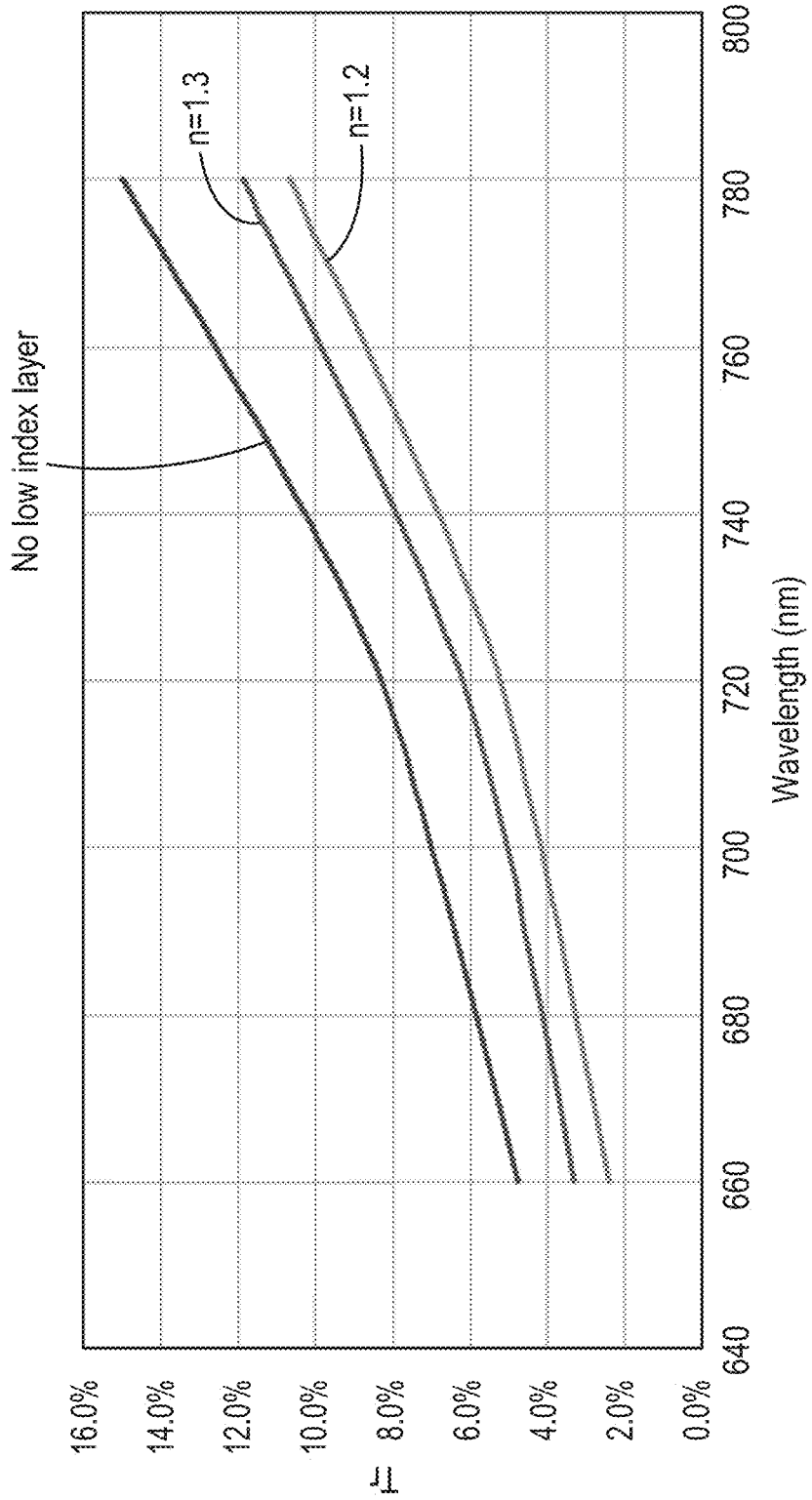
FIG. 7 shows the ratio of transmission through an exemplary optical construction with the optical filter included to the transmission with the optical filter omitted times 100 percent, according to some embodiments.

An optical construction as generally shown in FIGS. 1A-1B was made where the microlens and mask layers were made as generally described in U.S. Pat. Appl. Pub. No. 2021/0271003 (Yang et al.). A low index layer was disposed between the mask layer and an optical filter where the optical filter was a reflective multilayer optical film having the transmission versus wavelength shown in FIG. 6 for normally incident unpolarized light. Samples were made where the low index layer had a refractive index of n=1.2 or n=1.3 and comparative samples were made where no low index layer was included. Samples were also made where the optical filter was omitted for comparison. The samples were tested by using a collimated LED to illuminate the optical construction where two volume diffusers disposed on a 1 mm thick glass layer were disposed between the LED and the optical construction. The optical diffusers were included so that light having a wide range on incident angles were incident on the optical construction. Tests were carried out with different LEDs having different emission wavelengths to determine a wavelength dependence of the transmission. Each LED had an emission wavelength in a range from 660 nm to 780 nm. FIG. 7 shows results for Tr which is defined as the ratio of transmission with the optical filter included to the transmission with the optical filter omitted times percent. FIG. 7 shows that including the low index layer reduces the transmission of obliquely incident light through the optical construction.

Terms such as "about" will be understood in the context in which they are used and described in the present description by one of ordinary skill in the art. If the use of "about" as applied to quantities expressing feature sizes, amounts, and physical properties is not otherwise clear to one of ordinary skill in the art in the context in which it is used and described in the present description, "about" will be understood to mean within 10 percent of the specified value. A quantity given as about a specified value can be precisely the specified value. For example, if it is not otherwise clear to one of ordinary skill in the art in the context in which it is used and described in the present description, a quantity having a value of about 1, means that the quantity has a value between 0.9 and 1.1, and that the value could be 1.

Terms such as "substantially" will be understood in the context in which they are used and described in the present description by one of ordinary skill in the art. If the use of "substantially" with reference to a property or characteristic is not otherwise clear to one of ordinary skill in the art in the context in which it is used and described in the present description and when it would be clear to one of ordinary skill in the art what is meant by an opposite of that property or characteristic, the term "substantially" will be understood to mean that the property or characteristic is exhibited to a greater extent than the opposite of that property or characteristic is exhibited.

All references, patents, and patent applications referenced in the foregoing are hereby incorporated herein by reference in their entirety in a consistent manner. In the event of inconsistencies or contradictions between portions of the incorporated references and this application, the information in the preceding description shall control.

Descriptions for elements in figures should be understood to apply equally to corresponding elements in other figures, unless indicated otherwise. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations, or variations, or combinations of the specific embodiments discussed herein. Therefore, it is intended that this disclosure be limited only by the claims and the equivalents thereof.

What is claimed is:

1. An integral optical construction comprising:
a lens layer comprising a structured first major surface comprising a plurality of microlenses arranged two-dimensionally across the lens layer;
an optical filter disposed on the lens layer and comprising a plurality of polymeric layers numbering at least 10 in total, each of the polymeric layers having an average thickness of less than about 500 nm, such that for a first wavelength in a wavelength range extending from about nm to about 550 nm, a second wavelength in a wavelength range extending from about 600 nm to about 1500 nm, and for each of first and second orthogonal polarization states, the optical filter has:
an optical transmission of greater than about 50% for the first wavelength for each of a first incident angle of less than about 10 degrees and a second incident angle of greater than about degrees; and
for the second wavelength, an optical transmission of less than about 15% for the first incident angle and an optical transmission of greater than about 30% for the second incident angle;
an optically opaque mask layer disposed between the lens layer and the optical filter and defining a plurality of openings therein, the openings in a one-to-one correspondence with the microlenses, regions of the mask layer between the openings having an optical density of greater than about 2 for each of the first and second wavelengths; and
a low index layer disposed on the optical filter and having a sufficiently low index of refraction at the second wavelength so that light having the second wavelength and incident on the low index layer at the second incident angle undergoes total reflection, wherein the optical construction is an integral construction.

2. The integral optical construction of claim 1, wherein the lens layer and the low index layer have respective refractive indices n1 and n2 at the second wavelength, $1.005 < n2 < n1 - 0.05$.

3. The integral optical construction of claim 1, wherein the second wavelength is in a wavelength range extending from about 650 nm to about 1200 nm.

4. The integral optical construction of claim 1, wherein the low index layer comprises a nanovoided polymeric layer or a fluoropolymer layer.

5. An optical construction comprising:
a lens layer comprising an outermost structured first major surface and an opposing outermost substantially planar second major surface, the structured first major surface comprising a plurality of microlenses arranged along orthogonal first and second directions;

an optically opaque mask layer disposed on the second major surface of the lens layer, the mask layer defining a plurality of through openings therein arranged along the first and second directions, the through openings aligned to the microlenses in a one-to-one correspondence;

a low index layer disposed on a major surface of the mask layer and at least partially filling the through openings; and an optical filter disposed on the low index layer, such that for an incident light, a visible first wavelength and an infrared second wavelength, and a first incident angle less than about 10 degrees and a second incident angle greater than about 30 degrees:

for each of the first and second wavelengths, the lens layer substantially transmits the incident light for each of the first and second incident angles;

for the first incident angle, the optical filter substantially transmits the first wavelength and substantially blocks the second wavelength;

for the second incident angle, the optical filter substantially blocks the first wavelength and substantially transmits the second wavelength;

for the first incident angle, the low index layer substantially transmits the first and second wavelengths; and for the second incident angle, the low index layer substantially reflects at least the second wavelength.

6. The optical construction of claim 5, wherein for the second incident angle, the low index layer substantially reflects the first wavelength.

7. The optical construction of claim 5, wherein regions of the mask layer between the openings have an optical density of greater than about 2 for each of the first and second wavelengths.

8. The optical construction of claim 5, wherein the first wavelength is in a visible wavelength range extending from about 420 nm to about 550 nm, and the second wavelength is in an infrared wavelength range extending from about 700 nm to about 1200 nm.

9. An optical construction comprising:

a lens layer comprising an outermost structured first major surface and an opposing outermost substantially planar second major surface, the structured first major surface comprising a plurality of microlenses arranged along orthogonal first and second directions;

an optically opaque mask layer disposed on the second major surface of the lens layer, the mask layer defining a plurality of through openings therein arranged along the first and second directions, the through openings aligned to the microlenses in a one-to-one correspondence;

a low index layer disposed on a major surface of the mask layer and at least partially filling the through openings; and an optical filter disposed on the low index layer and substantially blocking light in a predetermined wavelength range at a first incident angle $\theta 1$ and substantially transmitting light in the predetermined wavelength range at a second incident angle $\theta 2$, the predetermined wavelength range being at least 100 nm wide and disposed between about 600 nm and about 1500 nm, a critical angle for light incident on the low index layer from the lens layer and having a first wavelength in the predetermined wavelength range being $\theta c$, $\theta 2 > \theta c > \theta 1$.

10. The optical construction of claim 9, wherein the low index layer comprises a first portion disposed on and substantially coextensive with the mask layer and a second portion at least partially filling the through openings and contacting the lens layer.

11. The optical construction of claim 10, wherein the first portion is a land portion having an average thickness less than about 5 times the first wavelength.

12. The optical construction of claim 10, wherein the lens layer and the second portion of the low index layer have respective refractive indices n1 and n2 at the first wavelength, $1.005 < n2 < n1 - 0.05$.

* * * * *